United States Patent
Park et al.

(10) Patent No.: US 7,328,445 B2
(45) Date of Patent: Feb. 5, 2008

(54) APPARATUS FOR TRANSFERRING A PICKUP OF A DISC DRIVE

(75) Inventors: Chan-Bum Park, Seoul (KR); Go-Hyun Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 362 days.

(21) Appl. No.: 10/736,534

(22) Filed: Dec. 17, 2003

(65) Prior Publication Data

US 2005/0034142 A1 Feb. 10, 2005

(30) Foreign Application Priority Data

Aug. 8, 2003 (KR) ...................... 10-2003-0055027

(51) Int. Cl.
*G11G 7/085* (2006.01)
(52) U.S. Cl. .................................... 720/676
(58) Field of Classification Search ................ 720/663, 720/664, 665, 676, 677, 679; 360/267.3; 369/219.1, 223, 244.1
See application file for complete search history.

(56) References Cited

U.S. PATENT DOCUMENTS

| | | | |
|---|---|---|---|
| 5,889,638 A | * | 3/1999 | Kabasawa et al. ....... 360/261.3 |
| 6,046,974 A | * | 4/2000 | Uehara ........................ 720/663 |
| 6,058,098 A | * | 5/2000 | Kato ........................... 720/663 |
| 6,414,933 B1 | * | 7/2002 | Anada et al. ............... 720/672 |
| 6,724,714 B1 | * | 4/2004 | Kato et al. .................. 720/672 |
| 6,922,841 B2 | * | 7/2005 | Lee et al. .................... 720/677 |

FOREIGN PATENT DOCUMENTS

JP 11306700 * 11/1999

* cited by examiner

*Primary Examiner*—Angel Castro
(74) *Attorney, Agent, or Firm*—Roylance, Abrams, Berdo & Goodman, LLP

(57) ABSTRACT

An apparatus for transferring a pickup of a disc drive which is movably installed on a pickup deck to move the pickup for recording/reproducing information by emitting light onto a disc. The appartus includes a lead screw rotatably installed at one side of the pickup deck, wherein a plurality of screw grooves are formed on an outer circumferential surface of the lead screw, and a slider coupled to the pickup and having at least one first protrusion closely inserted in the screw grooves of the lead screw to convert a rotational motion of the lead screw to a linear motion of the pickup. The pickup also has at least one second protrusion inserted in the screw grooves of the lead screw to prevent the first protrusion from being separated from the screw grooves of the lead screw.

8 Claims, 9 Drawing Sheets

APPARATUS FOR TRANSFERRING A PICKUP OF A DISC DRIVE

This application claims priority under 35 U.S.C. §119(a) from Korean Patent Application No. 2003-55027, filed on 8 Aug. 2003, in the Korean Intellectual Property Office, the disclosure of which is incorporated herein in its entirety by reference.

BACKGROUND OF THE INVENTION

1. Field of the Invention

The present invention relates to an apparatus for transferring a pickup of a disc drive. More particularly, the present invention is related to an apparatus which can stably transfer a pickup of a disc drive.

2. Description of the Related Art

In general, disc drives record information onto a disc such as a CD or DVD, or reproduce recorded information from a disc. The disc drive includes a pickup to record information or reproduce recorded information by emitting light on a recording surface of a rotating disc while sliding in a radial direction of the disc, and a pickup transferring apparatus which transfers the pickup.

FIG. 1 is a plan view illustrating a pickup assembly of a disc drive adopting a conventional pickup transferring apparatus. FIG. 2 is an exploded perspective view illustrating the pickup transferring apparatus shown in FIG. 1.

Referring to FIGS. 1 and 2, the disc drive includes a pickup deck 10 on which a spindle motor 20 and a pickup 30 are installed. The spindle motor 20 rotates a disc and the pickup 30 performs recording and reproduction of data by emitting light on a recording surface of the disc. The pickup deck 10 is typically installed on a disc tray (not shown) carrying a disc in a slim disc drive adopted in a notebook computer, or at a main frame forming a housing in a typical disc drive. A turntable 22 where the disc is placed is provided on an upper portion of the spindle motor 20. Various optical elements including an objective lens 32 are provided at the pickup 30.

The pickup 30 emits light onto the recording surface of the disc while moving in the radial direction of the disc. A pickup transferring apparatus is installed on the pickup deck 10. The pickup transferring apparatus includes a lead screw 46 rotatably installed at one side of the pickup deck 10 and a slider 48 fixedly installed on the pickup 30 to convert a rotational motion of the lead screw 46 to a linear motion of the pickup 30.

The lead screw 46 is rotated by receiving power from a drive motor 42 via connection gears 44. A plurality of protruding portions 48a engaged with screw grooves of the lead screw 46 are formed on a lower surface of the slider 48. A leaf spring 50 which applies an elastic force in a direction to press the upper surface of the slider 48 from the upside so that the slider 48 and the lead screw 46 closely contact each other is installed on the upper portion of the slider 48. A guide shaft 52 guiding the linear movement of the pickup 30 is installed at the other side of the pickup deck 10 parallel to the lead screw 46.

In the above structure, when the lead screw 46 is rotated by receiving power from the drive motor 42, the pickup 30 performs a linear motion by the protruding portions 48a of the slider 48 engaged with the screw grooves of the lead screw 46.

However, in the pickup transferring apparatus, when an external impact is applied to the disc drive, the slide 48 slides so that the protruding portions 48a are seated on a plurality of screw threads 46a, as shown in FIG. 3. In this case, the force of the leaf spring 50 can be greater than a driving force of the drive motor 42 so that the pickup 30 is not transferred. When the force of the leaf spring 50 is reduced, although the above problem may be solved, a backlash is generated due to a gap between the pickup 30 and the lead screw 46 so that the pickup 30 is moved unstably.

SUMMARY OF THE INVENTION

To solve the above described problems and to provide other advantages, the present invention provides an apparatus which can stably transfer a pickup of a disc drive.

According to an aspect of the present invention, an apparatus for transferring a pickup of a disc drive which is movably installed on a pickup deck to move the pickup for recording/reproducing information by emitting light onto a disc comprises a lead screw rotatably installed at one side of the pickup deck. A plurality of screw grooves are formed on an outer circumferential surface of the lead screw, and a slider coupled to the pickup and having a plurality of first protrusions is closely inserted in the screw grooves of the lead screw to convert a rotational motion of the lead screw to a linear motion of the pickup. A plurality of second protrusions are inserted in the screw grooves of the lead screw to prevent the first protrusions from being separated from the screw grooves of the lead screw.

The second protrusions are inserted in the screw grooves of the lead screw with a predetermined gap.

The slider comprises a base portion fixed to the pickup, a first extension portion extended from the base portion, on which the first protrusions are formed, and a second extension portion extended from the base portion, preferably in a direction different from the first extension portion, on which the second protrusions are formed. The first extension portion is also preferably formed separate from the second extension portion such that movement of the first extension portion due to an impact does not affect the second extension portion.

The first extension portion is preferably extended horizontally from the base portion and the second extension portion is preferably extended vertically from the base portion. The second extension portion is extended downwardly from the base portion.

A gap is provided between the second extension portion and the pickup to such an extent that, when the second extension portion is pushed toward the pickup, the second protrusions are not separated from the screw grooves of the lead screw. Furthermore, support portions are preferably provided on the pickup to support both sides of the second extension portion and further prevent the second protrusions from being separated from the screw grooves of the lead screw.

The apparatus further comprises an elastic member to apply an elastic force to the first extension portion to make the first protrusions closely contact the screw grooves of the lead screw. The elastic member is preferably a leaf spring.

BRIEF DESCRIPTION OF THE DRAWINGS

The above and other features and advantages of the present invention will become more apparent by describing in detail preferred embodiments thereof with reference to the attached drawing figures, in which.

In the drawings figures it will be understood that like reference numerals refer to like features and structures.

DETAILED DESCRIPTION OF THE PREFERRED EMBODIMENT

Figure 1:
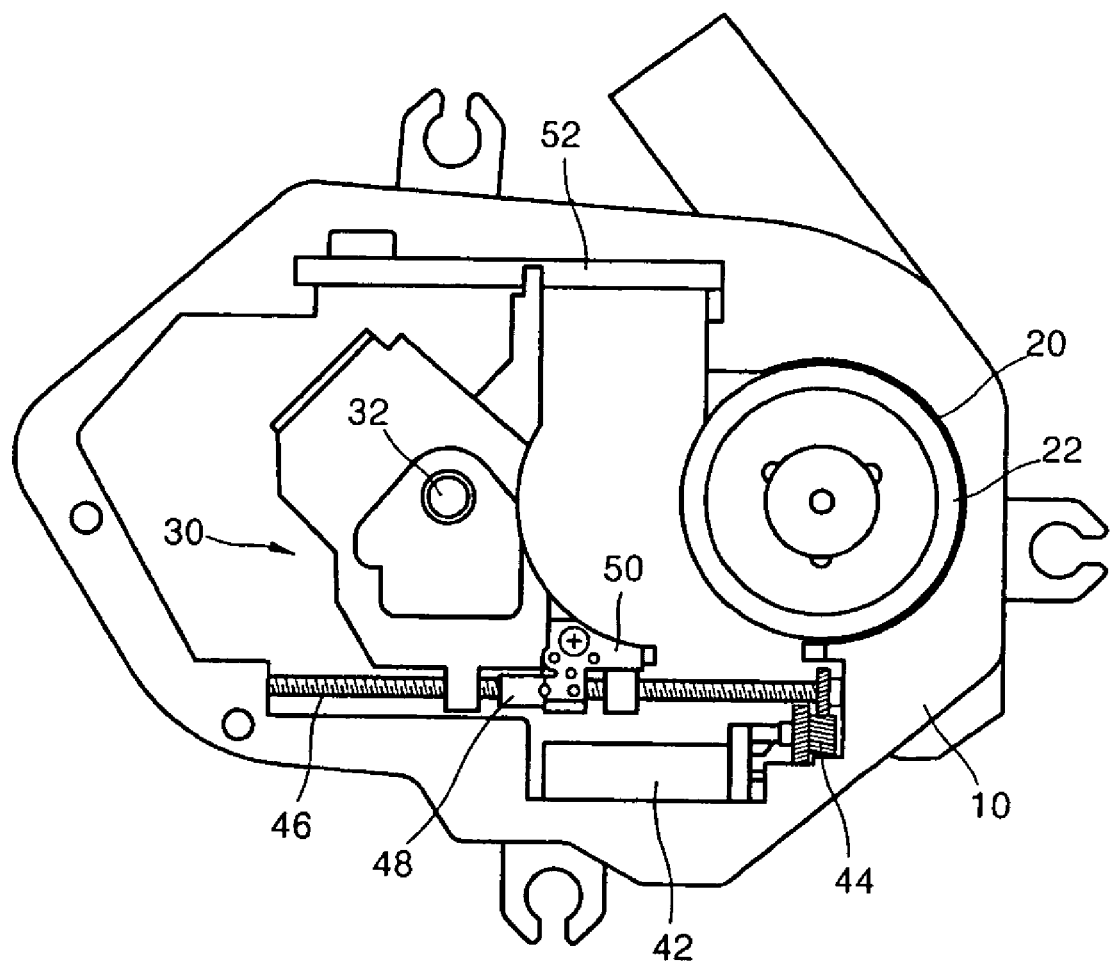
FIG. 1 is a plan view illustrating a pickup assembly of a disc drive adopting a conventional pickup transferring apparatus.
Figure 2:
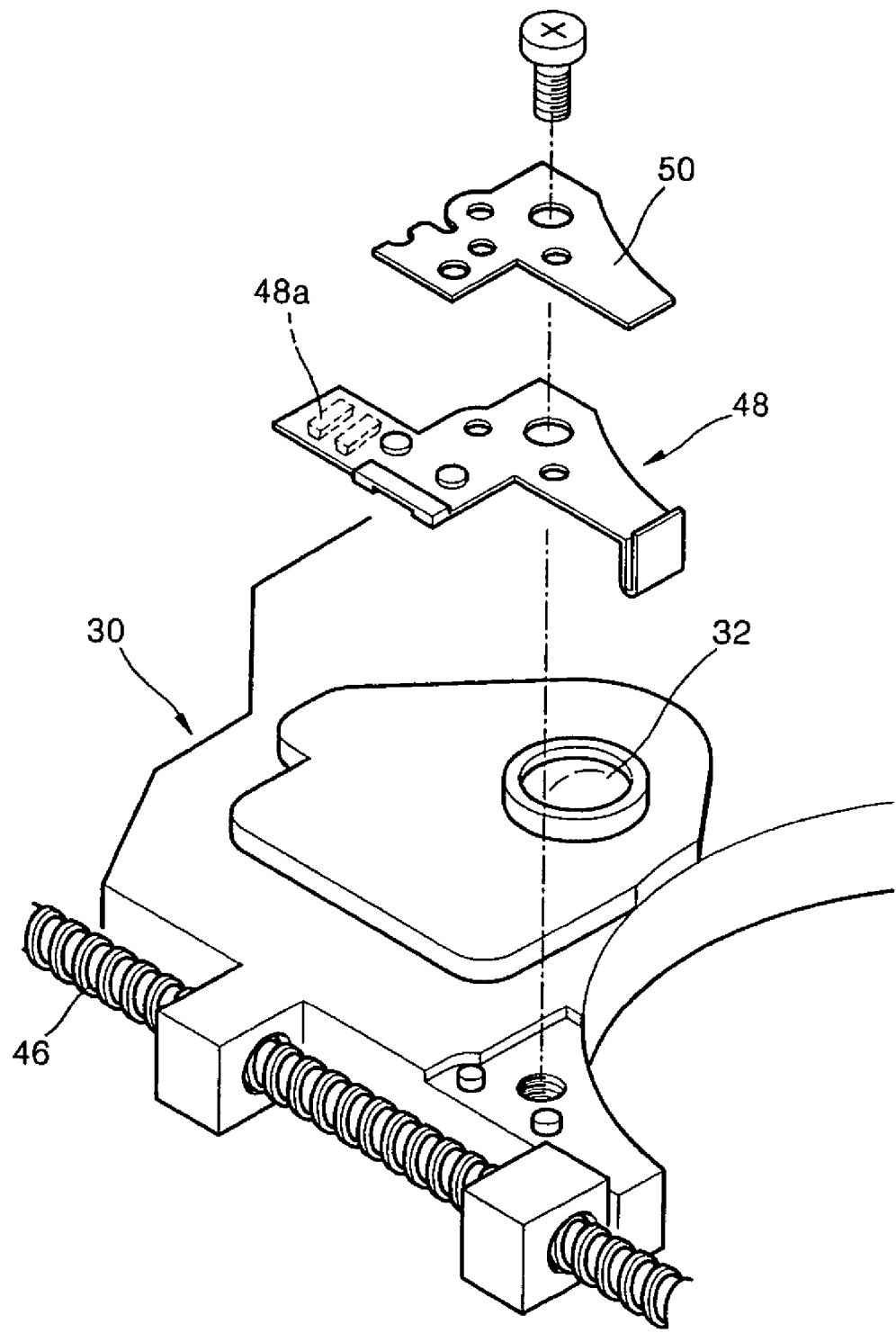
FIG. 2 is an exploded perspective view illustrating the conventional pickup transferring apparatus of FIG. 1.
Figure 3:
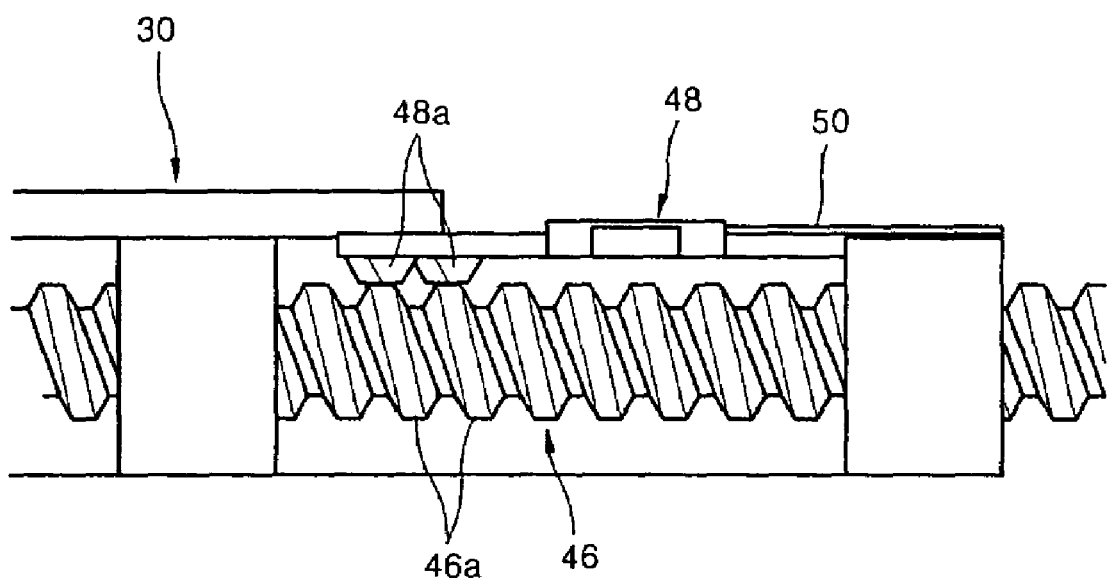
FIG. 3 is a view illustrating a state in which the protruding portions of the slide are seated on the screw threads of the lead screw.
Figure 4:
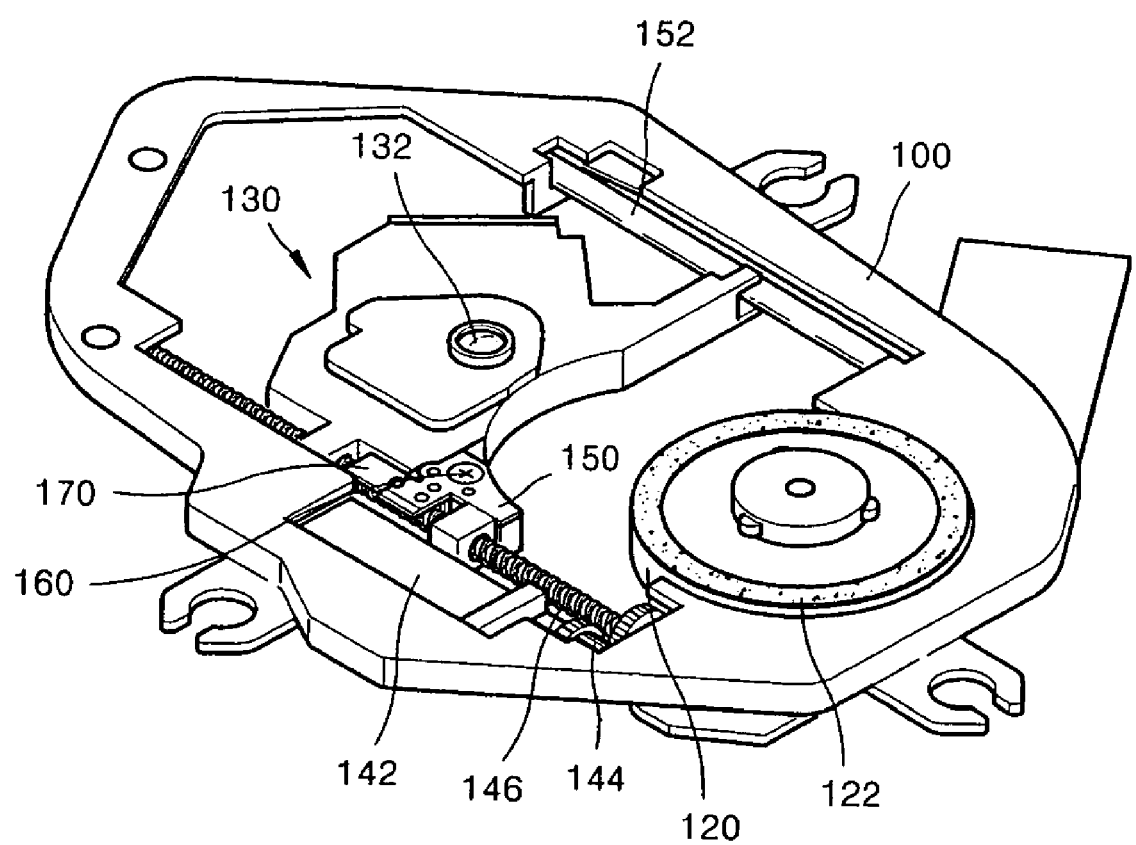
FIG. 4 is a perspective view illustrating a pickup assembly of a disc drive adopting pickup transferring apparatus according to an embodiment of the present invention.

Referring to FIG. 4, a pickup assembly of a disc drive according to a preferred embodiment of the present invention includes a pickup deck 100, a spindle motor 120 rotating a disc that is a recording medium, a pickup 130 movably installed on the pickup deck 100 and linearly moving in a radial direction of the disc to record or reproduce information by emitting light on a recording surface of the disc, and a pickup transferring apparatus to slide the pickup 130 in the radial direction of the disc. A turntable 122 on which the disc is accommodated is provided in the upper portion of the spindle motor 120. Various optical parts including an objective lens 132 are provided on the pickup 130.

The pickup transferring apparatus includes a lead screw 146 installed at one side of the pickup deck 100, a slider 170 coupled to the pickup 100 to convert a rotational motion of the lead screw 146 to a linear motion of the pickup 130, and a guide shaft 152 installed at the other side of the pickup deck 100 parallel to the lead screw 146 to guide the linear motion of the pickup 130.

The lead screw 146 is installed at one side of the pickup deck 100 and rotated by a drive motor 142 via connection gears 144.

Figure 5:
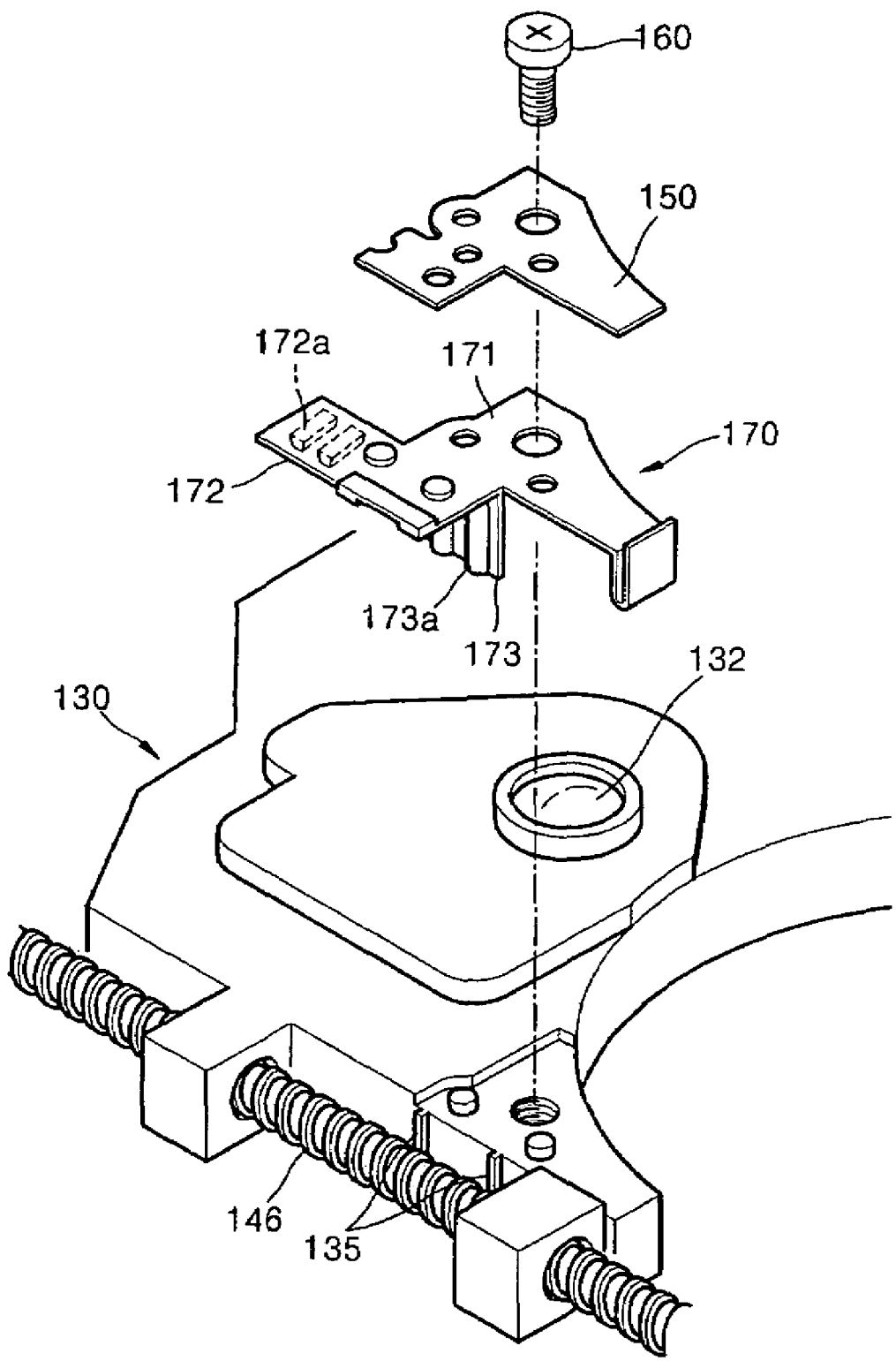
FIG. 5 is an exploded perspective view illustrating the pickup; transferring apparatus of FIG. 4.
Figure 6:
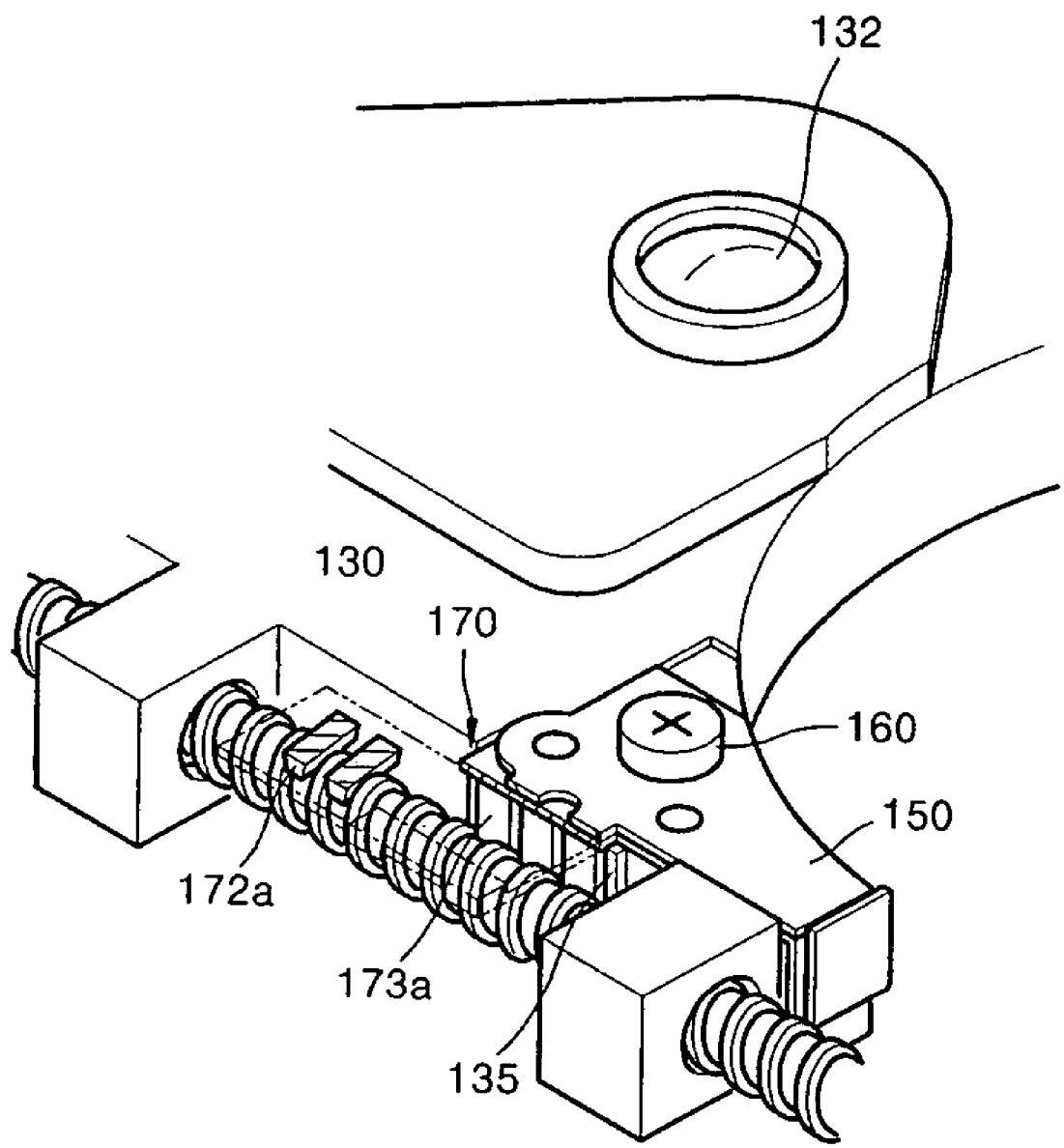
FIGS. 6 and 7 are views illustrating a state in which the pickup transferring apparatus of FIG. 5 are assembled.
Figure 7:
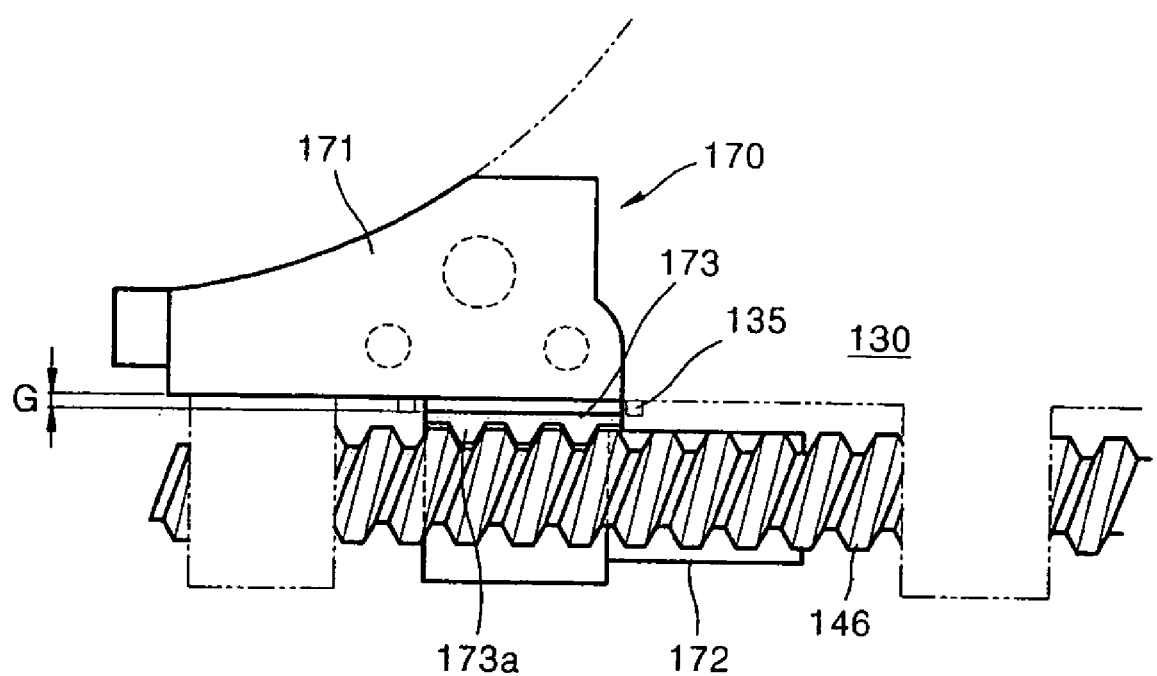

Referring to FIGS. 5 through 7, the slider 170 includes a base portion 171, a first extension portion 172, and a second extension portion 173.

The base portion 171 is fixed to the pickup 130 by a coupling screw 160, together with a leaf spring 150 which will be described in further detail below.

The first extension portion 172 is preferably horizontally extended from the base portion 171 to be disposed above the lead screw 146. One or more first protrusions 172a which are closely inserted in a plurality of screw grooves of the lead screw 146 are formed on a lower surface of the first extension portion 172. The first protrusions 172a convert the rotational motion of the lead screw 146 to the linear motion of the pickup 130.

The second extension portion 173 is preferably vertically extended downwardly from the base portion 171 to be disposed at the side of the lead screw 146. The second extension portion 173 is preferably formed separately from the first extension portion 172 such that movement of the first extension portion does not cause corresponding movement of the second extension portion 173. One or more second protrusions 173a which are closely inserted in the screw grooves of the lead screw 146 are formed on one side of the second extension portion 173. The second protrusions 173a are inserted in the screw grooves with a gap from the screw grooves. The second extension portion 173 prevents separation of the first protrusions 172a of the first extension portion 172 from the screw grooves of the lead screw 146. It should be understood that while the first and second extension portions are disposed in different directions, and preferably in a vertical and horizontal arrangement, the first and second extension portions can extend in any direction relative to each other.

As shown in FIG. 7, the second extension portion 173 is installed to be separated from the side surface of the pickup 130 by a predetermined gap G. The gap G between the second extension portion 173 and the pickup 130 allows the second extension portion 173 to move during an impact, so that the second extention portion is not destroyed by the impact. Two support portions 135 protrude from one side surface of the pickup 130. The support portions 135 support both sides of the second extension portion 173 of the slider 170 and prevent the second extention portion from being separated from the lead screw easily as will be described in greater detail below.

The leaf spring 150 is installed on an upper surface of the slider 170. The leaf spring 150 is an elastic member to apply an elastic force in a direction to press the first extension portion 172 of the slider 170 from the top side. The first protrusions 172a of the first extension portion 172 are inserted in the screw grooves of the lead screw 146 by the leaf spring 150 to closely contact the same.

When the lead screw 146 rotates by being driven by the drive motor 142, the first protrusions 172a of the first extension portion 172 closely inserted in the screw grooves of the lead screw 146 are moved along the screw grooves formed on an outer circumferential surface of the lead screw 146 and accordingly the pickup 130 is linearly moved in the radial direction of the disc. The second protrusions 173a of the second extension portion 173 separately inserted in the screw grooves of the lead screw 146 remain aligned with the screw grooves of the lead screw 146 as the slider 170 moves along the lead screw 146.

In this state, when an external impact is applied to the disc drive, the first protrusions 172a of the first extension portion 172 can become separated from the screw grooves of the lead screw 146 by the impact. In this case, since the second extension portion 173 having the second protrusions 173a which are inserted in the screw grooves of the lead screw 146 remain aligned with the screw grooves of the lead screw 146, the first protrusions 172a similarly remain aligned with the screw grooves of the lead screw 146. Even if the impact is great enough to cause the first protrusions 172a to become temporarily misaligned with the screw grooves, the first protrusions 172a are brought back into alignment with the screw grooves by their relative position to the second protrusions, and the fact that the second protrusions remain aligned with the screw grooves of the lead screw.

Figure 8A:
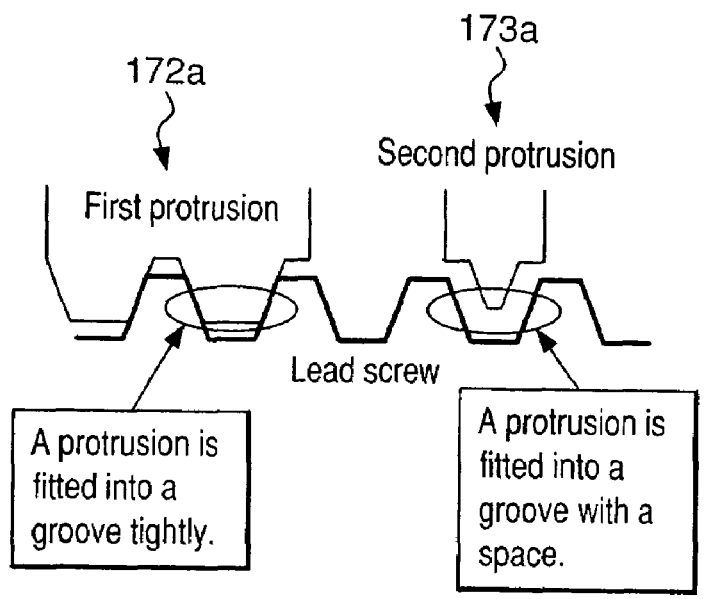
FIGS. 8(a) and 8(b) illustrate the interaction of the first and second protrusions with the screw grooves of a lead screw.

The interaction of the first and second protrusions and the lead screw will now be described in more detail with reference to FIGS. 8(a) and 8(b). FIG. 8(a) shows first protrusions 172a and second protrusion 173a in alignment with the screw grooves of the lead screw 146. In the illustrated preferred embodiment, the first protrusions 172a tightly fit into the screw grooves of the lead screw 146. This is advantageous for accurate movement of the pickup in the linear direction. Second protrusion 173a is preferably formed to fit loosely into the screw grooves of the lead screw 146. In otherwords, in the normal state there is space between the second protrusion 173a and the lead screw 146. Also, the first protrusions 172a are preferably adapted to move independently of the second protrusions 173a along the radial direction of the lead screw 146.

Figure 8B:
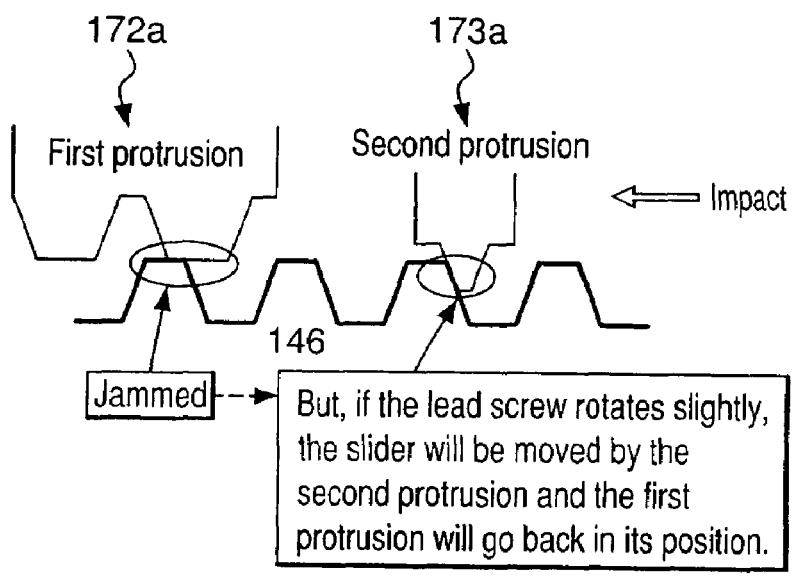

FIG. 8(b) illustrates the first and second protrusions after an impact. First protrusions 172a have become misaligned with the screw grooves of the lead screw 146. However, because the first extension portion 172 is formed separately from the second extension portion 173, and because the first protrusions 172a move indepedently of the second protrusions 173a in the radial direction of the lead screw, the second protrusions 173a remain aligned with the screw grooves of the lead screw 146. Thus, as the lead screw rotates, the first protrusions 172a are quickly brought back into alignment with the screw grooves of the lead screw 146.

When the first protrusions 172a are seated on the screw threads of the lead screw 146 by an external impact as shown in FIG. 8(b), since the second protrusions 173a closely contact one side of the screw grooves of the lead screw 146, by slightly rotating the lead screw 146, the pickup 130 is moved by the second extension portion 173. Accordingly, the first protrusions 172a of the first extension portion 172 quickly become realigned with the screw grooves of the lead screw 146.

Figure 9A:
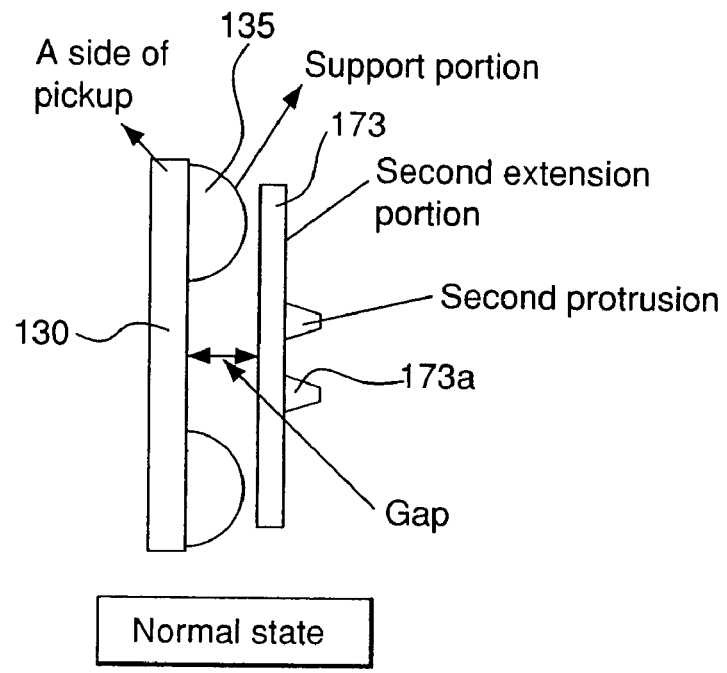
FIGS. 9a and 9b illustrate the interaction of the second extention portion with the support portions on the pickup during an impact.
Figure 9B:
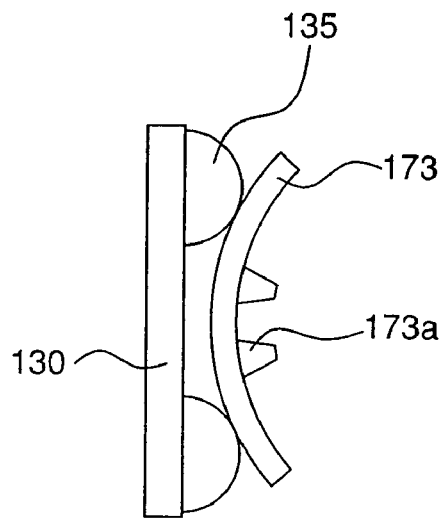

The interaction of the second extension portion 173, the support portions 135 and the pickup 130 during an impact will now be described in further detail with reference to FIGS. 9(a) and 9(b). As shown in FIG. 9(a), during the normal state, there is a gap G between the second extension portion 173 and the pickup. The gap G provides room for movement of the second extension portion 173 during an impact such that the second extention portion 173 is not destroyed by the impact. Support portion 135 normally prevents the second extension portion 173 from moving the full extent of the gap G. However, as shown in FIG. 9(b) during a large impact, the second extension portion 173 can flex further to avoid being destroyed, up to the full extent of the gap G. After the impact, the second extension portion 173 preferably flexes back to its normal state, and the second protrusions 173a remain aligned with the screw grooves of the lead screw 146.

Since the two support portions 135 protruding at the side of the pickup 130 support both sides of the second extension portion 173, when a small external impact is applied, the support portion 135 prevents the second extension portion 173 from being separated from the screw grooves of the lead screw. However, when a larger impact is applied, the support portions 135 allow the second extension portion 173 to flex further and avoid being damaged. Thus, the support portions 135 prevent the second protrusions 173a from becoming separated from the screw groove of the lead screw 146 unless a force exceeding a designated minimum is applied to the second protrusions 173.

As described above, the pickup transferring apparatus of a disc drive according to the present invention has the following effects.

First, since the problem that the protrusions of the slider becoming unseated from the screw threads of the lead screw during transfer of the pickup is prevented by the improved structure of the slider, the pickup is stably transferred.

Second, since a large amount of power is needed for the drive motor to solve the above problem according to the conventional technology, in the present invention, there is no need to increase power of the drive motor and accordingly power consumption is reduced.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An apparatus for converting a rotational movement to a linear movement, comprising:
    a lead screw;
    a pickup; and
    a slider having a first protrusion and a second protrusion which are inserted into the groove of said lead screw,
    wherein said first protrusion is adapted to substantially tightly fit into the groove of said lead screw whereby the rotational movement of said lead screw is converted into the linear movement of said pickup;
    wherein the second protrusion is adapted to remain in the groove of the lead screw even if the first protrusion is moved out of the thread of said lead screw; and
    wherein said slider further comprises a first extension portion on which the first protrusion is formed, and a second extension portion on which the second protrusion is formed,
    the apparatus further comprising a support portion adapted to support the second extension portion such that a designated minimum force is required to separate said second protrusion from the groove of said lead screw.

2. The apparatus of claim 1, wherein the second protrusion is adapted not to contact the lead screw when the first protrusion is in a normal position.

3. The apparatus of claim 1, wherein the first protrusion and the second protrusion are formed separately such that movement of the first protrusion along the radial direction of the lead screw does not cause the second protrusion to become separated from the screw groove of the lead screw.

4. The apparatus of claim 1, wherein the second extension portion extends in a different direction from the first extension portion.

5. A disc drive comprising:
    a deck having a lead screw thereon; and a pickup having a slider which is coupled to the lead screw, whereby said pickup is installed movably on said deck, wherein said slider comprises a first protrusion adapted to substantially tightly fit into the groove of said lead screw and a second protrusion adapted to have such a thickness that the second protrusion is in the groove even though the first protrusion is moved out of the thread of said lead screw; and wherein said slider further comprises a first extension portion on which the first protrusion is formed, and a second extension portion on which the second protrusion is formed, the apparatus further comprising a support portion adapted to support the second extension portion such that a designated minimum force is required to separate said second protrusion from the groove of said lead screw.

6. The apparatus of claim 5, wherein the second protrusion is adapted not to contact the lead screw when the first protrusion is in a normal position.

7. The apparatus of claim 5, wherein the first protrusion and the second protrusion are formed separately such that movement of the first protrusion along the radial direction of the lead screw does not cause the second protrusion to become separated from the screw groove of the lead screw.

8. The apparatus of claim 5, wherein the second extension portion extends in a different direction from the first extension portion.

* * * * *